United States Patent
Choi et al.

(10) Patent No.: US 7,899,010 B2
(45) Date of Patent: Mar. 1, 2011

(54) METHOD AND APPARATUS FOR TRANSMITTING DATA FROM A FIRST COMMUNICATION DEVICE TO A SECOND COMMUNICATION DEVICE

(75) Inventors: Hyung-Nam Choi, Hamburg (DE); Florian Steinmann, Wolfenbuettel (DE)

(73) Assignee: Infineon Technologies AG (DE)

( * ) Notice: Subject to any disclaimer, the term of this patent is extended or adjusted under 35 U.S.C. 154(b) by 391 days.

(21) Appl. No.: 11/619,776

(22) Filed: Jan. 4, 2007

(65) Prior Publication Data
US 2007/0153684 A1 Jul. 5, 2007

(30) Foreign Application Priority Data
Jan. 5, 2006 (DE) .................. 10 2006 000 937

(51) Int. Cl.
*H04W 4/00* (2009.01)
(52) U.S. Cl. ...................... 370/329; 370/465
(58) Field of Classification Search ......... 370/229–240, 370/329
See application file for complete search history.

(56) References Cited

U.S. PATENT DOCUMENTS

| | | | | |
|---|---|---|---|---|
| 6,804,219 | B2 * | 10/2004 | Koo et al. ................. | 370/335 |
| 7,474,643 | B2 * | 1/2009 | Malladi et al. ............. | 370/329 |
| 7,526,289 | B2 | 4/2009 | Schwarz et al. | |
| 2004/0017795 | A1 | 1/2004 | Abraham et al. | |
| 2004/0085916 | A1 * | 5/2004 | Nakamura et al. .......... | 370/282 |
| 2005/0163075 | A1 | 7/2005 | Malladi et al. | |
| 2005/0237935 | A1 * | 10/2005 | Chae et al. ................ | 370/232 |

FOREIGN PATENT DOCUMENTS

| | | |
|---|---|---|
| CN | 1310897 A | 8/2001 |
| CN | 1685754 A | 10/2005 |
| DE | 101 38 717 | 2/2003 |
| WO | WO-99/66748 A1 | 12/1999 |
| WO | WO-01/50637 A1 | 7/2001 |
| WO | WO 2004/040935 A1 | 5/2004 |

OTHER PUBLICATIONS

3GPP TS 25.211 v5.0.0 (2002-2003).*
ETSI TS 125 331 V5.13.0 (Jun. 2005); Technical Specification; Universal Mobile Telecommunications System (UMTS); Radio Resource Control (RRC) protocol specification (3GPP TS 25.331 version 5.13.0 Release 5).
K.D. Kammeyer,; Nachrichtenuebertragung, Teubner, Stuttgart, Germany, ISBN 3-519-16142-7, Chapter 16 Code Multiplex Transmission, pp. 621-638.

* cited by examiner

*Primary Examiner*—Huy D Vu
*Assistant Examiner*—Benjamin Lamont
(74) *Attorney, Agent, or Firm*—Dickstein Shapiro LLP

(57) ABSTRACT

Method and apparatus for transmitting data from a first communication device to a second communication device, wherein the first communication device can assume at least two communication link states. The data is transmitted by the first communication device when the first communication device is in the first communication link state, as a function of the amount of data to be transmitted via a first jointly used communication channel or via a second jointly used communication channel to the second communication device. The data is transmitted by the first communication device, when the first communication device is in the second communication link state, via a third jointly used communication channel to the second communication device.

16 Claims, 6 Drawing Sheets

FIG 1
CONVENTIONAL
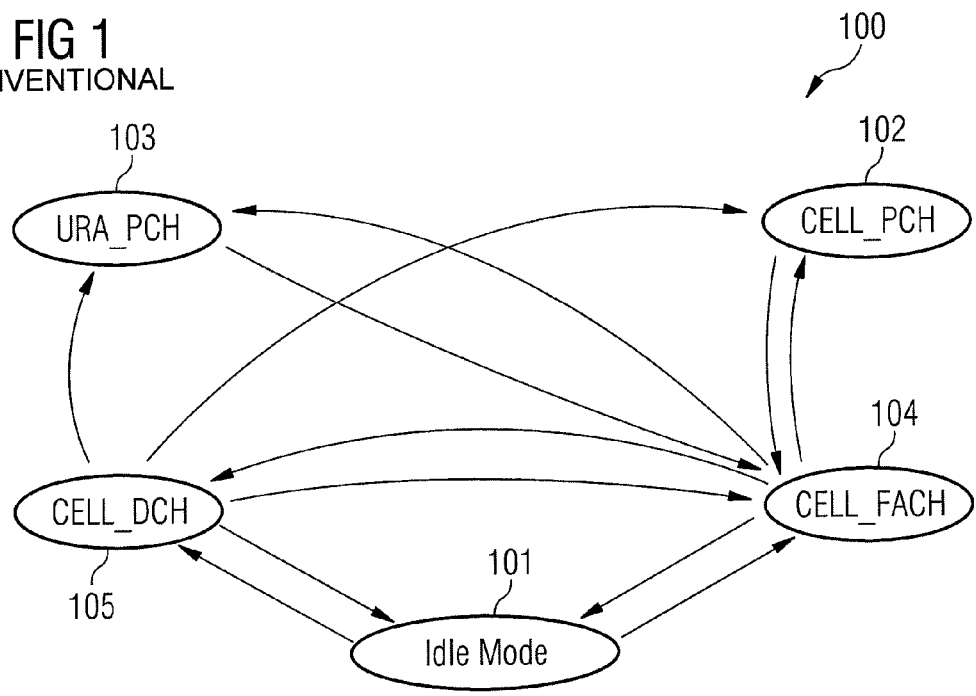
FIG 2
CONVENTIONAL
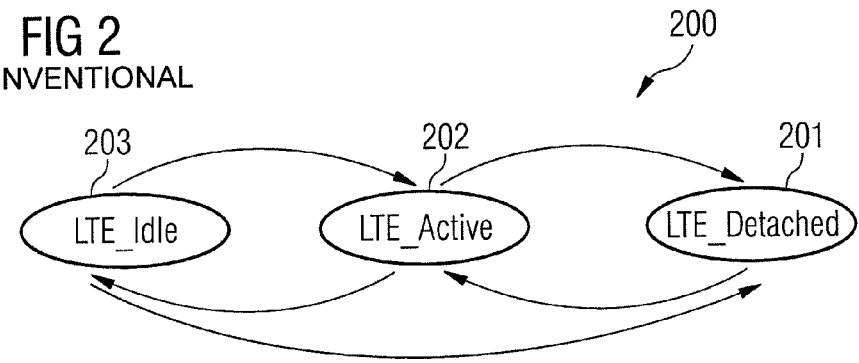

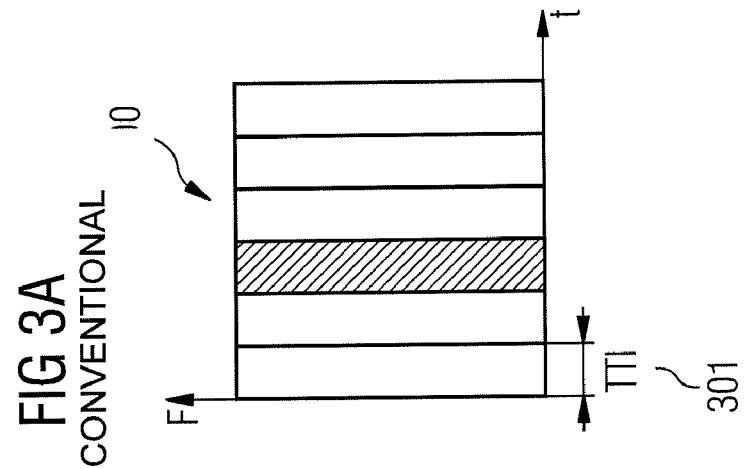
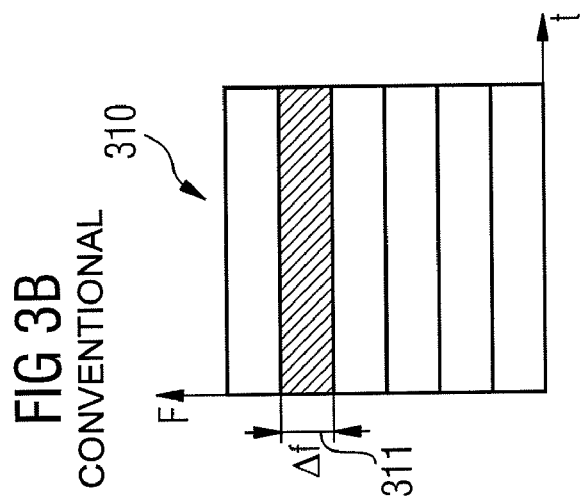
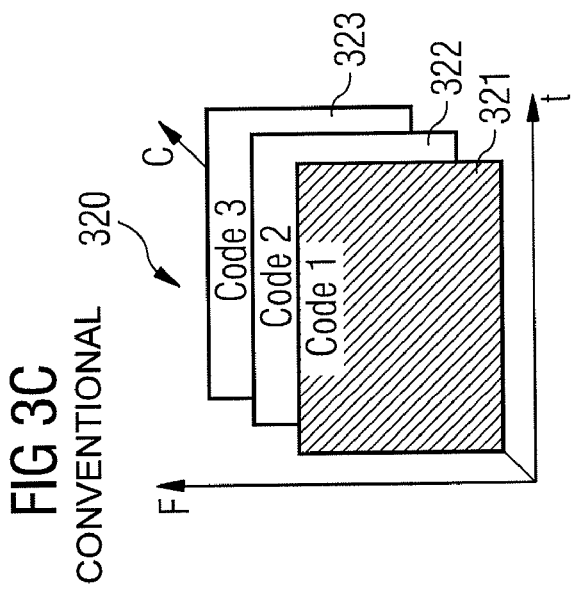

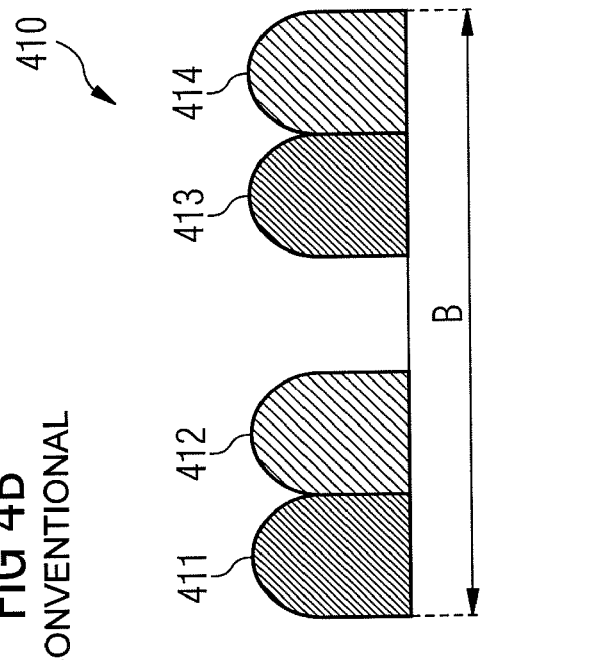
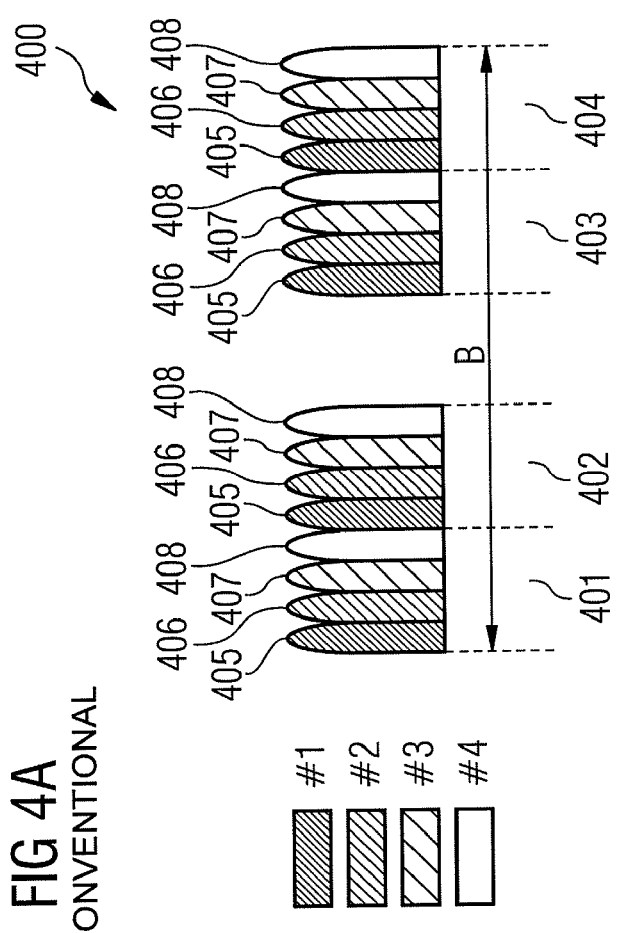

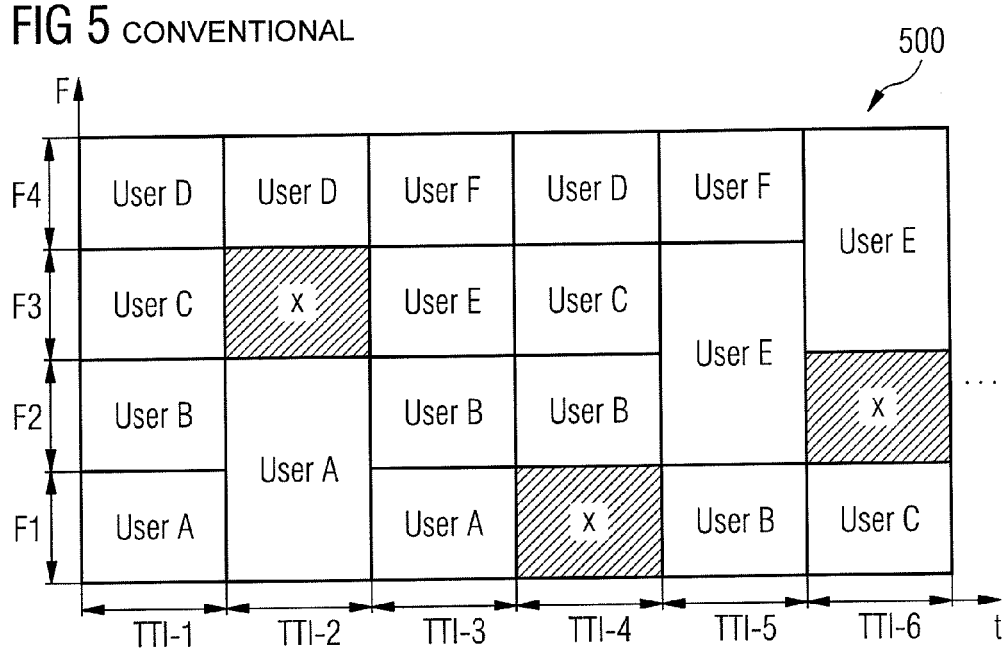
FIG 5 CONVENTIONAL
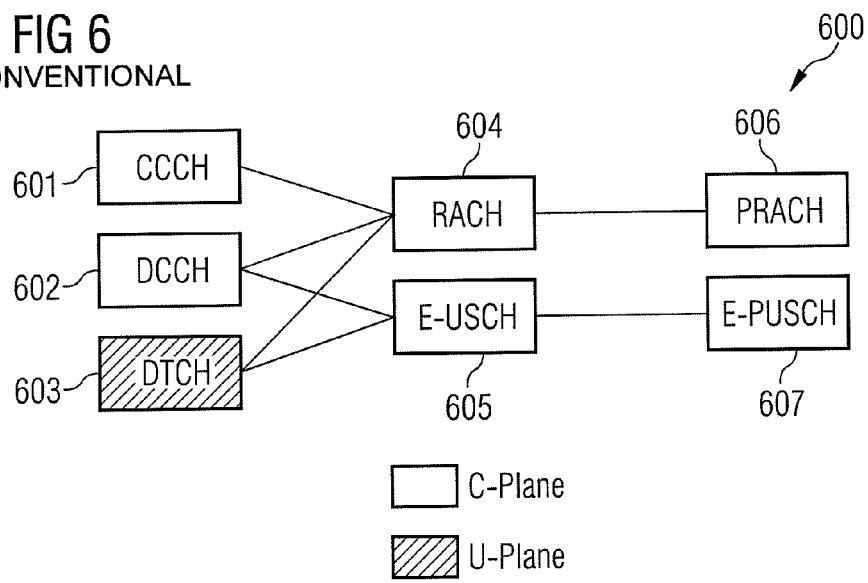
FIG 6 CONVENTIONAL

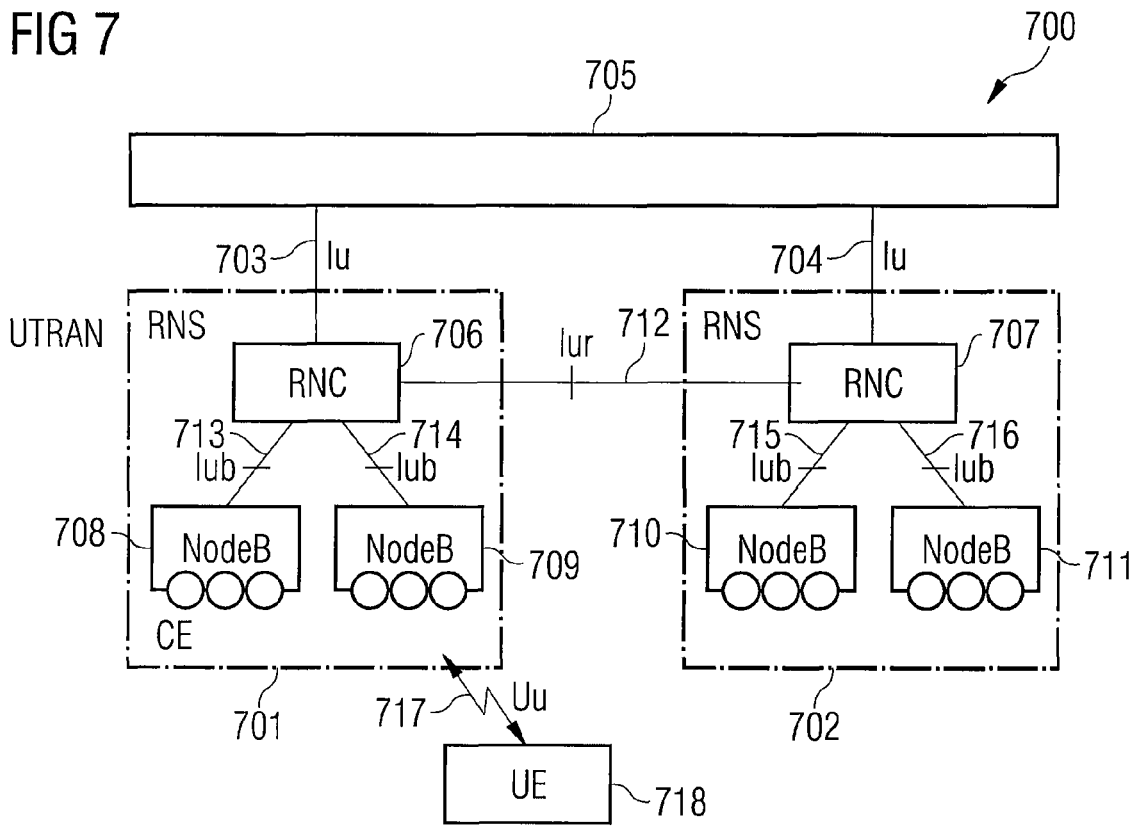
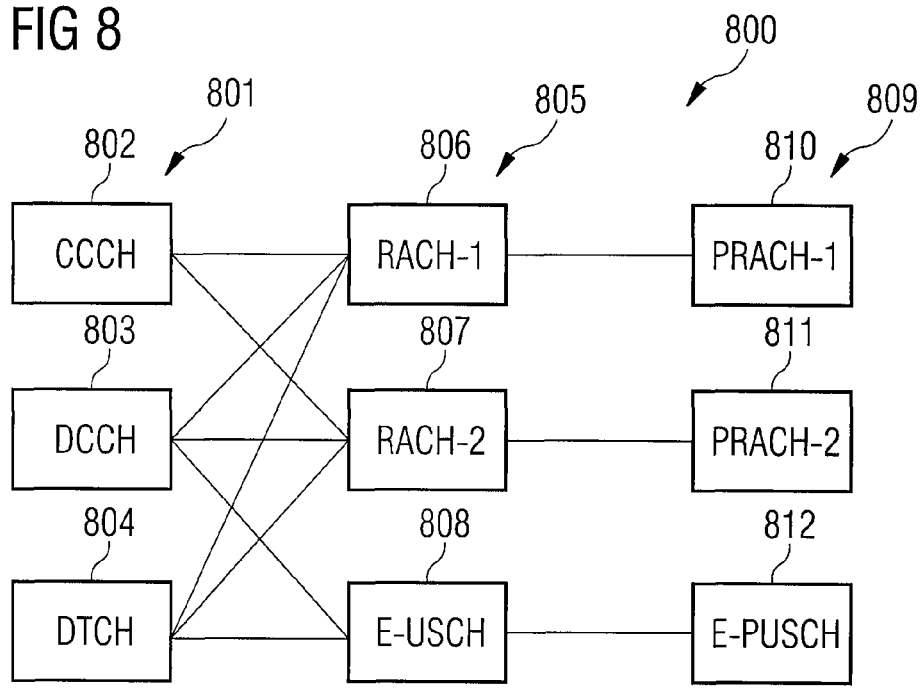

METHOD AND APPARATUS FOR TRANSMITTING DATA FROM A FIRST COMMUNICATION DEVICE TO A SECOND COMMUNICATION DEVICE

CROSS-REFERENCE TO RELATED APPLICATION

This application claims priority to German Patent Application Serial No. 10 2006 000 937.1, which was filed Jan. 5, 2006, and is incorporated herein by reference in its entirety.

TECHNICAL FIELD

The invention relates to a method for the transmission of data from a first communication device to a second communication device, to a communication device and to a computer program element.

BACKGROUND

Joint communication channels, which are used for data transmission by a plurality of subscribers or communication terminals, are being increasingly used in modern communication systems, such as mobile radio communication systems. In order to allow joint use of such communication channels, multiple access methods are used, which should be designed as efficiently as possible with regard to communication resource allocation.

BRIEF DESCRIPTION OF THE FIGURES

In the figures

FIG. 1 shows a state diagram of the states and state transitions provided in accordance with the radio resource protocol;

FIG. 2 shows a state diagram of the states and state transitions provided in accordance with the radio resource protocol for the 3GPP long term evolution;

FIGS. 3A to 3C show diagrams illustrating the methods of operation of various multiple access methods, with TDMA being explained in FIG. 3A, FDMA being explained in FIG. 3B, and CDMA being explained in FIG. 3C;

FIGS. 4A and 4B show diagrams illustrating the methods of operation of a distributed FDMA method (FIG. 4A) and of a localized FDMA method (FIG. 4B);

FIG. 5 shows a block diagram, illustrating the principle of resource allocation in the uplink transmission direction for IFDMA/TDMA;

FIG. 6 shows a block diagram, illustrating the transmission channels provided in the mobile radio communication terminal in the uplink transmission direction for the 3GPP long term evolution;

FIG. 7 shows a communication system according to an exemplary embodiment of the invention;

FIG. 8 shows a block diagram, illustrating the transmission channels which are provided in the mobile radio communication terminal in the uplink transmission direction according to an exemplary embodiment of the invention;

DETAILED DESCRIPTION

Figure 9:
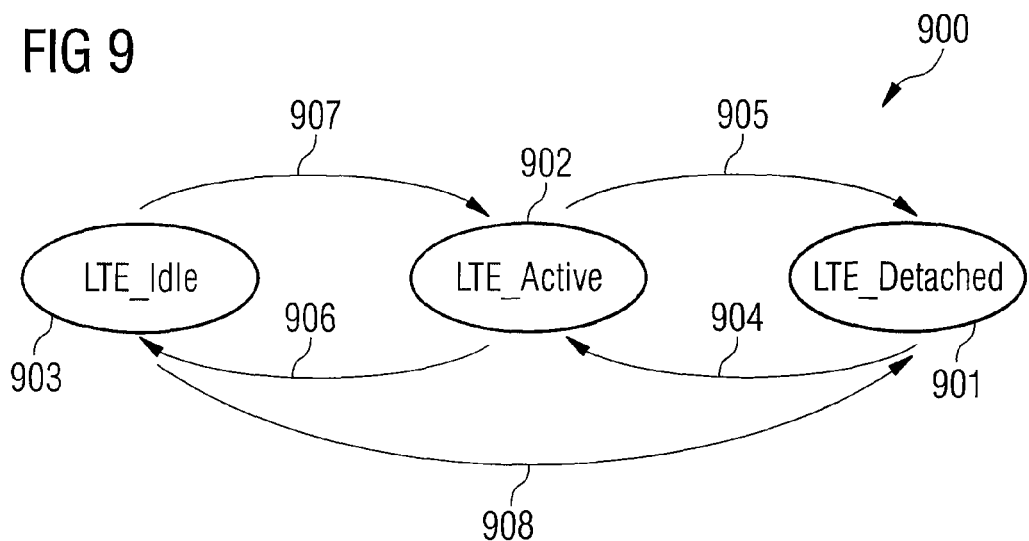
FIG. 9 shows a state diagram of the states and state transitions provided in accordance with the radio resource protocol for the 3GPP long term evolution, according to an exemplary embodiment of the invention.

The current UMTS standard, referred to as Release 6, allows a maximum net transmission rate of 10 Mbps in the downlink transmission direction, and 2 Mbps in the uplink transmission direction. FDD (Frequency Division Duplex) and TDD (Time Division Duplex) are specified as radio transmission technologies, and the multiple access method is based on CDMA (Code Division Multiple Access).

The 3GPP standardization committees (3GPP: $3^{rd}$ Generation Partnership Project) are currently discussing the further development of UMTS (Universal Mobile Telecommunications System) to form a mobile radio communication system optimized for packet data transmission, by improvement to the system capacity and spectral efficiency.

This work is being carried out in the 3GPP standardization committees under the general heading of LTE (Long Term Evolution).

The aim of LTE is to increase the maximum net transmission rates considerably in the future, to be precise up to 100 Mbps in the downlink transmission direction and 50 Mbps in the uplink transmission direction.

Among other items, new multiple access methods, new channel structures, methods for optimized radio resource monitoring and new network architectures are being investigated in order to improve the transmission via the air interface.

One potential candidate for the new multiple access methods is IFDMA (Interleaved Frequency Division Multiple Access) in conjunction with TDMA for the uplink (that is to say for the uplink transmission direction). The combined IFDMA/TDMA method is a single-carrier, multiple access method in which the data from a subscriber is transmitted over a defined frequency band in the frequency spectrum and over a defined transmission time in the time domain.

According to LTE, the present intention with regard to new channel structures is for the data traffic in future to be handled only via joint transport channels in order in this way to allow more dynamic matching of the mobile radio resources in a mobile radio cell. In the case of joint transport channels, the mobile radio resources which are associated with the joint transport channels can be dynamically split between all of the subscribers in a mobile radio cell as a function of the traffic load and of the UE activity (activity of the mobile radio communication terminal, that is to say the user equipment (UE)).

The use of a new multiple access method in combination with a new channel structure will lead to a change in the data transmission at the physical level and in the mobile radio resource monitoring at the RRC (Radio Resource Control) protocol layer level.

In the current UMTS communication system, also referred to as UMTS Release 6, two types of transport channels are defined in the uplink: the dedicated channels DCH and the joint channels RACH (Random Access Channel).

When a radio link is to be set up between a subscriber mobile radio communication terminal (User Equipment, UE) and communication network, dedicated mobile radio resources or joint, or in other words jointly used, mobile radio resources are allocated by the RRC protocol layer in the RNC (Radio Network Controller) to the subscriber mobile radio communication terminal as a function of the current traffic situation in a mobile radio cell and the requested Quality of Service (QoS). The DCH resources are permanently allocated to a subscriber mobile radio communication terminal for as long as the dedicated mobile radio link is in existence. The major characteristics of a dedicated transport channel are the short transmission delay, transmission at high data rates up to 2 Mbps (net), the power efficiency as a result of closed power regulation, and the gain resulting from macrodiversity. In a corresponding manner, the major characteristics of a joint transport channel are the relatively long transmission delay, the transmission at only low or medium data rates, and the power inefficiency by means of open power regulation.

At most up to 16 RACHs (Random Access Channel) can be configured in one mobile radio cell. The configuration of these RACHs is signaled by means of the broadcast channel to all UEs located in that mobile radio cell. The UE chooses a RACH in the RRC protocol layer. The RACH transmission by means of the air interface takes place using the so-called slotted ALOHA access method, that is to say collisions can occur as a result of UEs which have chosen the same RACH transmitting at the same time.

Five communication link states are defined for efficient monitoring of the radio resources allocated to a UE, in the RRC protocol layer: Idle Mode, CELL_PCH, URA_PCH, CELL_FACH and CELL_DCH which differ from one another by the nature of the allocated resources, by the activity of the UE and by where and at which level the position of the UE is known.

Conventional possible state transitions between the individual RRC states are illustrated in a first state diagram 100 in FIG. 1.

In a first RRC state Idle Mode 101, there is no signaling communication link and no payload data communication link between a subscriber mobile radio communication terminal (UE) and the RNC. The subscriber mobile radio communication terminal is not known at all in the mobile radio access network (UTRAN, UMTS Terrestrial Radio Access Network) and is known in the UMTS core network (Core Network, CN) only at the level of the Routing Area (RA) and of the Location Area (LA). In the idle mode 101, a UE can read the system information on the broadcast channel (BCH) and can receive notifications via the paging channel (PCH).

In a second RRC state CELL_PCH 102, there is only a logic signaling communication link between the subscriber mobile radio communication terminal (UE) and the RNC. In this state, a UE can receive the broadcast messages from the communication network, and listens to the joint paging channel PCH. The position of a UE is known at cell level in this state.

A third RRC state URA_PCH 103 is similar to the second RRC state CELL_PCH with the difference that the communication network knows only the group of cells URA (UTRAN Registration Area) in which the subscriber mobile radio communication terminal (UE) is located.

In a fourth RRC state CELL_FACH 104, there is a signaling communication link and a payload data communication link between the subscriber mobile radio communication terminal (UE) and the RNC. In this state, the UE is assigned joint resources which it must share with other UEs, for example the transport channel RACH in the uplink and the transport channel FACH in the downlink. In this state, the position of the UE is known at cell level.

In a fifth RRC state CELL_DCH 105, there is a signaling communication link and a payload data communication link between the subscriber mobile radio communication terminal (UE) and the RNC. In this state, dedicated resources are assigned to the UE, and the position of the UE is known at cell level.

Within an existing mobile radio communication link, the RNC dynamically matches the mobile radio resources configured for a UE as a function of the respective traffic load in the mobile radio cell and the UE activity, that is to say when, for example, a UE in the fifth RRC state CELL_DCH 105 is currently receiving or transmitting only a small amount of data via the dedicated resources, the RNC can arrange a state transition of the UE in the fourth RRC state CELL_FACH 104 by explicit signaling at the RRC protocol layer level. In this case, the dedicated mobile radio communication link is cleared, and the packet data transmission is then continued by means of the joint resources in the new, fourth RRC state CELL_FACH 104. If the UE activity increases again and the respective traffic load in the mobile radio cell allows this, a new dedicated mobile radio communication link can be set up.

With respect to the further development of UMTS to form a mobile radio system optimized for packet data transmission, new channel structures, inter alia, as well as methods for optimized radio resource monitoring are being investigated, that is to say the aim is that, in future, the payload data transmission will take place only via joint (or shared) transport channels, and the number of RRC states will be reduced.

FIG. 2 uses a second state diagram 200 to show an example of the future mobile radio resource monitoring with only three RRC states:

A subscriber mobile radio communication terminal (UE) is in a first LTE-RRC state LTE_Detached 201 immediately after it is switched on. In this state, there is no signaling communication link or payload data communication link between the UE and the communication network. Furthermore, the UE is not known in the communication network, but can read the system information on the broadcast channel BCH.

In a second LTE-RRC state LTE_Active 202, there is a signaling communication link and a payload data communication link between the UE and the communication network. In this state, joint (or shared) resources are assigned to the UE, and the position of the UE is known at cell level.

In a third LTE-RRC state LTE_Idle 203, there is only a signaling communication link between the UE and the communication network. In this state, a UE can read the system information on the broadcast channel BCH, and can receive the paging channel PCH. Furthermore, the network knows the position of a UE at the cell group level.

In general, a mobile radio channel is a time-variant and frequency-selective channel. In the case of a fixed-position transmitter, the time variance is caused by the movement of the mobile receiver. The frequency selectivity is caused by the multipath propagation. The characteristics of the mobile radio channel lead to the signal from the transmitter reaching the mobile receiver not only on the direct path but also on various paths with different delay times and attenuation influences. The received signal is thus composed of a large number of components, whose amplitudes, delay times and phases behave randomly. The received signal thus represents a distorted and disturbed version of the transmitted signal. One task of the receiver is now to once again reverse the disturbances introduced into the transmitted signal by the mobile radio channel.

By way of example, multiple access methods are used to transmit data from different subscribers via the mobile radio channel.

The object of a multiple access method is to regulate the access of the subscribers to the mobile radio channel so that they do not interfere with one another. The characteristics of the mobile radio channel are also taken into account in this case.

The following fundamental multiple access methods are known: TDMA, FDMA and CDMA, whose fundamental principles are illustrated symbolically in FIG. 3A, FIG. 3B, FIG. 3C. In FIG. 3A, FIG. 3B, FIG. 3C, F in each case denotes a frequency axis, and t a time axis.

In the case of TDMA (Time Division Multiple Access) (see first diagram 300 in FIG. 3A), the entire frequency band, but only a defined transmission time TTI (Transmission Time Interval) 301, are available to each subscriber for the transmission of data. Only one transmitter is active during one transmission time interval TTI 301.

In the case of FDMA (Frequency Division Multiple Access) (see second diagram 310 in FIG. 3B), all of the time but only a defined (narrow) frequency band width $\Delta f$ 311 of the overall bandwidth are available to each subscriber for the transmission of data. Only one subscriber may ever be active in each of these frequency bands $\Delta f$ 311.

In the case of CDMA (Code Division Multiple Access) (see third diagram 320 in FIG. 3C), all of the time and the entire frequency band are available to each subscriber for the transmission of data. In order to avoid mutual interference between the signals from the various transmitters, each subscriber is assigned a binary code pattern 321, 322, 323, which patterns are independent of one another and which are used to code or spread the payload signal on a subscriber-specific basis.

IFDMA (Interleaved Frequency Division Multiple Access) is a special case of FDMA, in which the signals from the individual subscribers are transmitted distributed over the available frequency band B, that is to say interleaved in one another. This is achieved by the signal to be transmitted first of all being compressed by a factor L in the time domain and then being arranged in rows CRF-times. The compression expands the original signal spectrum by the factor L, and compresses its amplitude. As a result of the CRF-times repetition, (CRF-1) zeros are inserted at equidistant intervals between the individual carrier frequencies. Data from other subscribers can then be inserted in a suitable form in these gaps. This results in the frequency spectrum in the form of a comb. A distinction is drawn between two sub-forms of IFDMA, see FIG. 4A and FIG. 4B, depending on the CRF that is used.

Distributed FDMA results from CRF>1 and offers frequency diversity (see FIG. 4A). In a first frequency band diagram 400, FIG. 4A shows four frequency range elements 401, 402, 403, 404 over a predetermined frequency range B, in which case all are configured in the same way with one frequency band 405, 406, 407, 408 respectively being allocated to the subscribers in each frequency range element 401, 402, 403, 404 in which they can transmit data in the respective frequency range element 401, 402, 403, 404.

Localized FDMA results from CRF=1, corresponds to classical FDMA and offers multiuser diversity (see FIG. 4B). In a second frequency band diagram 410, FIG. 4B shows respective frequency ranges 411, 412, 413, 414, which are each intended for different subscribers and in which the respective subscribers can transmit their data.

In a future multiple access method based on IFDMA/TDMA, a user is assigned a defined frequency bandwidth as well as a transmission time by the communication network for data transmission in the uplink.

In this context, FIG. 5 uses a first time/frequency diagram 500 to illustrate an example in which six users (user A to user F) are dynamically assigned different resource blocks by the network for the transmission times (TTI-1 to TTI-6). Furthermore, defined resource blocks (identified by "X" in FIG. 5) can be reserved by the communication network for special purposes, for example for the transmission of signaling information. Without any restriction to the generality, FIG. 5 illustrates a "localized FDMA" system (that is to say an IFDMA for which CRF=1).

FIG. 6 shows a block diagram 600 illustrating the transmission channels which are provided in the mobile radio communication terminal in the uplink transmission direction on the basis of the 3GPP long term evolution. FIG. 6 shows three logic channels 601, 602, 603, specifically a Common Control Channel (CCCH) 601, a Dedicated Control Channel (DCCH) 602 and a Dedicated Traffic Channel (DTCH) 603. The data in the logic channels 601, 602, 603 is mapped onto transport channels 604, 605 as shown in FIG. 6 onto a Random Access Channel (RACH) 604 and onto an Enhanced Uplink Shared Channel E-USCH) 605. The data in the transport channels 604, 605 is itself mapped onto physical channels 606, 607 as shown in FIG. 6 onto a Physical Random Access Channel (PRACH) 606 and an Enhanced Physical Uplink Shared Channel (E-PUSCH) 607, by means of which the data is transmitted via the air interface.

According to an exemplary embodiment of the invention, efficient transmission of data is achieved by using a multiple access method.

Exemplary refinements of the invention are specified in the dependent claims. The described refinements apply in the same sense both to the method for transmission of data from a first communication device to a second communication device, for the communication device and for the computer program element.

In the case of a method according to an exemplary embodiment of the invention for transmission of data from a first communication device to a second communication device, in which case the first communication device can assume at least two communication link states (according to a refinement of the invention at least three communication link states), the first communication device, when it is in the first communication link state and depending on the amount of data to be transmitted, transmits this data by means of a first jointly used communication channel or by means of a second jointly used communication channel to the second communication device. When it is in the second communication link state, it transmits data by means of a third jointly used communication channel to the second communication device.

A communication device, for example a mobile radio communication device, has a data transmission control unit for controlling the transmission of the data onto a communication channel. The data transmission control unit is designed such that it provides at least two communication link states (according to a refinement of the invention at least three communication link states), in which, when it is in a first communication link state and depending on the amount of data to be transmitted, it allocates this data to a first jointly used communication channel or to a second jointly used communication channel, and in which case, when it is in a second communication link state, it allocates the data to be transmitted to a third jointly used communication channel. Furthermore, the communication device has a transmission unit for transmission of the data by means of the jointly used communication channel, to which the data to be transmitted is allocated.

Furthermore, a computer program element is provided which, when it is in the form of the communication device, has the method steps described above.

In the case of an exemplary embodiment of the invention, depending on the amount of data to be transmitted (clearly the traffic load or the data to be transmitted which, for example, is stored in the transmission buffer of the respective channel, for example the respective transport channel or the respective protocol layer unit which provides or assists the channel, or a profile of the data transmission in a predetermined time interval in the past) the communication device clearly uses a first jointly used communication channel for example when the communication device is in the active communication link state and the amount of data to be transmitted is relatively large (for example when the amount of data to be transmitted is greater than a predetermined threshold value), for example an uplink shared channel (USCH) in the case of UMTS (for example an enhanced uplink shared channel in the case of LTE), and in the situation where only a small amount of data has to be transmitted by the communication device (for example when the amount of data to be transmitted is less than a predetermined threshold value), uses a second jointly used communication channel, for example a first random access channel (RACH). Furthermore, in the second communication link state, in which by way of example there is only one signaling communication link between the two communication devices, the signaling data is transmitted by means of a third jointly used communication channel, for example by means of a second random access channel (RACH).

Advantages of exemplary embodiments of the invention can be seen, for example, in the fact that the transmission of data for a multiple access method, for example for an IFDMA/TDMA multiple access method, is in general alternatively efficiently matched, for example, for an FDMA multiple access method or a TDMA multiple access method. The mobile radio resource monitoring can be more dynamically matched as a function of the UE activity and the traffic flow, for example in the mobile radio cell.

The first communication device and/or the second communication device may be in the form of a mobile radio communication device or devices. In other words, the invention can advantageously be used in the mobile radio field, in which case, for example, different jointly used transport channels can be chosen as a function of the amount of data, in general as a function of the amount of data to be transmitted, when the communication device is in the active communication link state, in other words when the communication device is in the communication link state when both a signaling communication link and payload data communication link are setup between the two communication devices.

The first communication device may be a communication terminal (in the situation in which the invention is being used in a mobile radio communication system, for example, a mobile radio communication terminal, for example a user equipment (UE) according to UMTS), and the second communication device may be a communication network device (in the situation in which the invention is used in a mobile radio communication system, for example a mobile radio base station, for example a NodeB according to UMTS). In this situation, the data transmission is clearly carried out in the uplink transmission direction, that is to say from a communication terminal to a communication network unit.

In an alternative refinement of the invention, the first communication device may be a communication network device (when the invention is being used in a mobile radio communication system, for example, a mobile radio base station for example a NodeB according to UMTS) and the second communication device may be a communication terminal (when the invention is being used in a mobile radio communication system, for example a mobile radio communication terminal, for example a user equipment (UE) according to UMTS). In this case, the data is clearly transmitted in the downlink transmission direction, that is to say from a communication network unit to a communication terminal.

It should be noted that the invention can be used in any desired communication system, for example in a landline communication system or in a mobile radio communication system (for example in a mobile radio communication system according to GSM (Global System for Mobile Communications), GPRS (General Packet Radio Service), EDGE (Enhanced Data-Rates for GSM Evolution), UMTS, CDMA2000, FOMA (Freedom of Mobile Multimedia Access) in general by way of example, in a mobile radio communication system of the second generation, of the third generation or of a future generation).

According to another refinement of the invention, the first communication device can have set up a signaling communication link in the first communication link state and a data communication link with the second communication device (according to LTE, this corresponds, for example, to the communication link state LTE_Active).

Furthermore, when the first communication device is in the second communication link state, it can have set up only one signaling communication link with the second communication device (according to LTE this corresponds, for example, to the communication link state LTE_Idle).

Jointly used transport channels (also referred to as "common" or "shared" channels, for example the so-called random access channel (RACH) and/or the so-called uplink shared channel (USCH), for example the so-called enhanced uplink shared channel (E-USCH)) are used, for example as mobile radio channels which are jointly used as jointly used communication channels.

By way of example, in this case, a first random access channel can be used as the second jointly used communication channel, and a second random access channel can be used as the third jointly used communication channel. This refinement of the invention clearly means that the second jointly used communication channel and the third jointly used communication channel are of the same type, for example they are both jointly used communication channels of the random access channel type. The first jointly used communication channel is, for example, an uplink shared channel (USCH) or an enhanced uplink shared channel (E-USCH).

The second communication channel and the third communication channel may be allocated different time periods and/or different frequency ranges.

In this situation, an IFDMA/TDMA multiple access method may be used, for example, as the multiple access method, as has been explained above. Alternatively, however, it is also possible to use a pure FDMA multiple access method, a pure TDMA multiple access method or a different FDMA/TDMA multiple access method for the purposes of the invention.

If the communication channels are transport channels, then, according to a refinement of the invention, the data from the first communication channel is mapped onto a first jointly used physical communication channel (for example onto a physical uplink shared channel), and the data in the first communication channel is transmitted by means of the first jointly used physical communication channel to the second communication device (for example by means of the physical uplink shared channel).

Furthermore, the data from the second communication channel can be mapped onto a second jointly used physical communication channel (for example onto a physical random access channel), and the data in the second communication channel can be transmitted by means of the second jointly used physical communication channel to the second communication device (for example by means of the physical random access channel).

Furthermore, the data from the third communication channel can be mapped onto a third jointly used physical communication channel (for example onto a (different) physical random access channel), and the data in the third communication channel can be transmitted by means of the third jointly used physical communication channel to the second communication device (for example by means of the physical random access channel).

According to an exemplary embodiment of the invention, a method is clearly proposed for efficient data transmission and radio resource monitoring in an IFDMA/TDMA-based radio interface in the uplink.

Exemplary embodiments of the invention are illustrated in the figures and will be explained in more detail in the following text. Similar or identical elements are provided, as far as this is expedient, with identical reference symbols in the figures.

FIG. 7 shows a UMTS mobile radio communication system 700, for reasons related to making the illustration simpler in particular the components of the UMTS mobile radio access network (UMTS Terrestrial Radio Access Network, UTRAN) which has a plurality of mobile radio network subsystems (RNS) 701, 702, each of which are connected to the UMTS core network (CN) 705 by means of a so-called Iu interface 703, 704. A mobile radio network subsystem 701, 702 has a respective mobile radio network monitoring unit (Radio Network Controller RNC) 706, 707 as well as one or more UMTS base stations 708, 709, 710, 711 which, according to UMTS, are also referred to as NodeB.

Within the mobile radio access network, the mobile radio network monitoring units 706, 707 for the individual mobile radio network subsystems 701, 702 are connected to one another by means of a so-called Iur interface 712. Each mobile radio network monitoring unit 706, 707 in each case monitors the allocation of mobile radio resources in all of the mobile radio cells in a mobile radio network subsystem 701, 702.

A UMTS base station 708, 709, 710, 711 is in each case connected to a mobile radio network monitoring unit 706, 707 which is allocated to one of the UMTS base stations 708, 709, 710, 711 by means of a so-called Iub interface 713, 714, 715, 716.

Each UMTS base station 708, 709, 710, 711 clearly, in radio terms, covers one or more mobile radio cells (CE) within a mobile radio network subsystem 701, 702. Message signals or data signals are transmitted by means of an air interface, referred to according to UMTS as a Uu air interface 717, preferably using a multiple access transmission method, between a respective UMTS base station 708, 709, 710, 711 and a subscriber unit 718 (user equipment, UE), also referred to in the following text as a mobile radio terminal in a mobile radio cell.

By way of example, a separate signal transmission takes place in the uplink and downlink directions (uplink: signal transmission from the mobile radio terminal 718 to the respective UMTS base station 708, 709, 710, 711; downlink: signal transmission from the respectively associated UMTS base station 708, 709, 710, 711 to the mobile radio terminal 718) using the UMTS-FDD mode (Frequency Division Duplex) by means of appropriate separate assignment of frequencies or frequency ranges. According to an exemplary embodiment of the invention, the IFDMA/TDMA multiple access transmission method described above is used as the multiple access transmission method and, by way of example, uses an FDD radio transmission technology.

A plurality of subscribers, in other words a plurality of activated mobile radio terminals 718 or mobile radio terminals 718 which have been registered in the mobile radio access network, in the same mobile radio cell are preferably separated from one another, for signaling purposes, by means of defined frequency ranges and transmission time intervals.

In this context, it should be noted that FIG. 7 illustrates only one mobile radio terminal 718, in order to keep the illustration simple. In general, however, there may be any desired number of mobile radio terminals 718 in the mobile radio system 700.

The communication between a mobile radio terminal 718 and another communication appliance can be set up by means of a complete mobile radio communication link to another mobile radio terminal, alternatively to a landline communication appliance.

FIG. 8 uses a block diagram 800 to show the transmission channels which are provided in the mobile radio communication terminal 718 and are implemented therein in the uplink transmission direction, according to one exemplary embodiment of the invention.

As illustrated in FIG. 8, a Common Control Channel (CCCH) 802, a Dedicated Control Channel (DCCH) 803 and a Dedicated Traffic Channel (DTCH) 804 are provided as logic channels 801. The data in the logic channels 801 is mapped onto transport channels 805, in which case three transport channels 805 are provided according to this exemplary embodiment of the invention, a first Random Access Channel (RACH-1) 806, a second Random Access Channel (RACH-2) 807 and an Enhanced Uplink Shared Channel (E-USCH) 808. The data in the transport channels 805 is itself mapped onto physical channels 809, as illustrated in FIG. 8, by way of example, onto a first Physical Random Access Channel (PRACH-1) 810, a second Physical Random Access Channel (PRACH-2) 811 and an Enhanced Physical Uplink Shared Channel (E-PUSCH) 812, by means of which the data is transmitted via the air interface Uu 717.

FIG. 9 uses a third state diagram 900 to show one example of the mobile radio resource monitoring according to one exemplary embodiment of the invention, with only three RRC states:

A subscriber mobile radio communication terminal (UE) is in a first RRC state LTE_Detached 901 immediately after it has been switched on. In this state, there is no signaling communication link or payload data communication link between the UE 718 and the communication network 701, 702. Furthermore, the UE 718 is not known in the communication network 701, 702, but can read the system information on the broadcast channel BCH.

In a second RRC state LTE_Active 902, there is a signaling communication link and a payload data communication link between the UE 718 and the communication network 701, 702. In this state joint (or shared) resources are assigned to the UE 718, and the position of the UE 718 is known at cell level.

In a third RRC state LTE_Idle 903, there is only a signaling communication link between the UE 718 and the communication network 701, 702. In this state, a UE 718 can read the system information on the broadcast channel BCH and can receive the paging channel PCH. Furthermore, the network knows the position of a UE 718 at cell group level.

As will be explained in more detail in the following text, the following state transitions between the RRC states 901, 902, 903 are provided according to this exemplary embodiment of the invention:

A first state transition 904 from the first RRC state LTE_Detached 901 to the second RRC state LTE_Active 902; in the course of this state transition, a signaling communication link and a payload data communication link are set up between the UE 718 and the communication network 701, 702.

A second state transition 905 from the second RRC state LTE_Active 902 to the first RRC state LTE_Detached 901; in the course of this state transition, the signaling communication link and the payload data communication link which have been set up between the UE 718 and the communication network 701, 702 are cleared.

A third state transition 906 from the second RRC state LTE_Active 902 to the third RRC state LTE_Idle 903; in the course of this state transition, the payload data communication link which has been set up between the UE 718 and the communication network 701, 702 is cleared, although the signaling communication link which has been set up between the UE 718 and the communication network 701, 702 is maintained.

A fourth state transition 907 from third RRC state LTE_Idle 903 to the second RRC state LTE_Active 902; in the course of this state transition, a payload data communication link is set up between the UE 718 and the communication network 701, 702.

A fifth state transition 908 from the third RRC state LTE_Idle 903 to the first RRC state LTE_Detached 901; in the course of this state transition, the signaling communication link which has been set up between the UE 718 and the communication network 701, 702 is cleared.

According to an exemplary embodiment of the invention, efficient data transmission and radio resource monitoring are provided in the uplink in an IFDMA/TDMA-based radio interface.

The channel structure illustrated in FIG. 8 is assumed and the radio resource monitoring which is illustrated in FIG. 9 and has been explained above and which has only three RRC states 901, 902, 903 is also assumed, with only two types of joint transport channels, in other words jointly used transport channels, and physical channels being provided.

Signaling information and user data are intended to be transmitted at a low to a high data rate (for example of approximately 64 kbps up to approximately 50 Mbps) and with a relatively short transmission delay (for example <5 ms) by means of the first type of transport channel that is provided, according to this exemplary embodiment of the invention by means of the transport channel E-USCH, which is mapped onto the physical channel E-PUSCH. The configuration of these channels (CRF parameters, frequency offsets, etc.) are signaled to the UE 718 in a dedicated form from the network 701, 702, for example from the RNC 706. According to this exemplary embodiment of the invention, the UE 718 is allowed to use these channels only when it is in the second RRC state LTE_Active 902. In principle, these channels can be transmitted in all of the TTIs and frequency resource blocks except for those which are reserved for RACH transport channels Type 1 and Type 2, as will be explained in more detail in the following text (see the block diagram 1000 in FIG. 10, which illustrates resource allocation in the uplink transmission direction on the basis of IFDMA/TDMA according to one exemplary embodiment of the invention).

Only signaling information and user data are intended to be transmitted at a medium or low data rate (for example of approximately 64 kbps or approximately 1 Mbps) and with a relatively long transmission delay (for example >>5 ms, for example >10 ms, for example >100 ms) by means of the second type of transport channel that is provided, according to this exemplary embodiment of the invention by means of the transport channel RACH, which is mapped onto the physical channel PRACH.

According to one exemplary embodiment of the invention, two sub-types of the RACH transport channel are defined, as in the following characteristics:

RACH transport channel Type 1 (for the purposes of this description, also referred to as RACH-1):
The configuration of these channels (CRF parameters, frequency offsets etc.) are signaled using the broadcast channel BCH to all of the subscribers located in the mobile radio cell. A total of N (N is any desired natural number) of these channels can be configured in one mobile radio cell.

According to an exemplary embodiment of the invention, the UE 718 can use these channels only when it is in the third RRC state LTE_Idle 903.

A UE 718 selects a channel randomly. In consequence, it is possible for collisions to occur with other UEs which have chosen the same channel.

Figure 10:
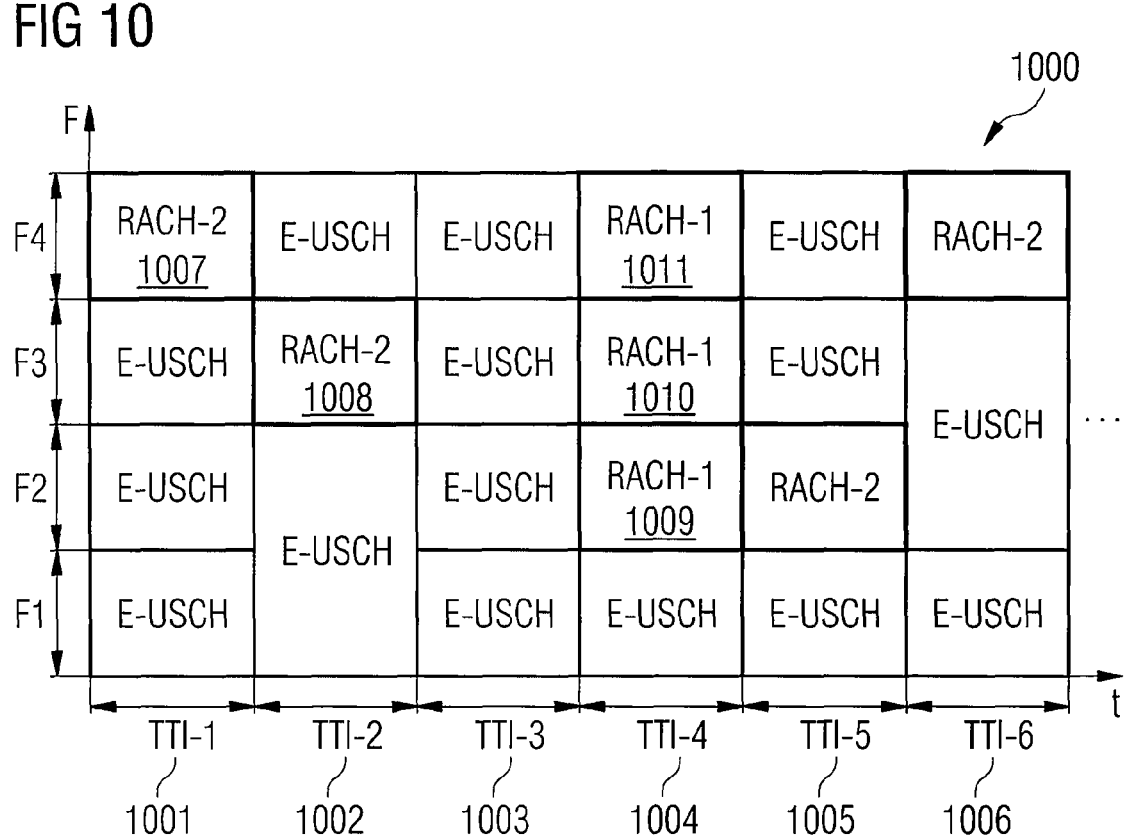
FIG. 10 shows a block diagram, illustrating resource allocation in the uplink transmission direction for IFDMA/TDMA, according to an exemplary embodiment of the invention.

These channels can be sent only to specific (reserved) TTIs (for example TTI-4 1004 in the block diagram 1000 in FIG. 10). This has the advantage that transmission by means of these channels is less likely to be subject to frequency interference.

It should be noted that, in alternative embodiments, these channels are sent only in specific (reserved) frequency ranges.

In another alternative embodiment, it is possible to provide for these channels to be sent only to specific (reserved) TTIs in specific (reserved) frequency ranges.

RACH transport channel Type 2 (also referred to as RACH-2 for the purposes of this description):
The configuration of these channels (CRF parameters, frequency offsets etc.) is signaled to the UE 718 in a dedicated form from the network 701, 702.

According to an exemplary embodiment of the invention, the UE 718 may use these channels only when it is in the second RRC state LTE_Active 902.

The same RACH transport channel Type 2 can be allocated for a plurality of UEs by the network 701, 702. In consequence, collisions can likewise occur with other UEs. However, the monitoring of the network 701, 702 makes it possible to resolve any collisions by suitable reconfiguration of these channels.

These channels can be sent only to specific (reserved) TTIs.
These channels can be sent only to specific (reserved) TTIs (for example TTI-1 1001, TTI-2 1002, TTI-5 1003, TTI-6 1006 in the block diagram 1000 in FIG. 10). This has the advantage that transmission by means of these channels is less susceptible to frequency interference.

It should be noted that, in alternative embodiments, these channels are sent only in specific (reserved) frequency ranges.

In another alternative embodiment, it is possible to provide for these channels to be sent only to specific (reserved) TTIs in specific (reserved) frequency ranges.

According to an exemplary embodiment of the invention, it is thus possible either to transmit data by means of Type 1 RACH channels or to transmit data by means of Type 2 RACH channels, but not to transmit data simultaneously by means of Type 1 RACH channels and by means of Type 2 RACH channels, in a defined TTI and/or a defined frequency band. A clear association is therefore provided from a communication link state, for example an RRC state of the UE 718, to the transmission authorization of data to predefined channels, for example transport channels.

The radio resources for E-USCH and RACH are allocated by the network 701, 702 on the basis of a defined transmission period, that is to say the transmission scheme is repeated after a defined number of TTIs.

Within an existing radio link, the mobile radio network dynamically adapts the mobile radio resources configured for a UE 718 as a function of the respective traffic load in the mobile radio cell and the UE activity, that is to say, for example, when a UE 718 is in the second RRC state LTE_Active 902 and is currently transmitting only a small amount of data via the E-USCH resources, the mobile radio network can instruct the UE 718 to continue the payload data transmission by means of the Type 2 RACH resources. In addition, if there is temporarily no data available for uplink transmission, the mobile radio network can signal to the UE 718 a state transition to the third RRC state LTE_Idle 903, in which the UE 718 can then transmit signaling information only by means of Type 1 RACH resources.

The UE 718 is located in a mobile radio cell in which localized FDMA is configured, that is to say IFDMA with CRF=1, alternatively in a mobile radio cell in which distributed FDMA is configured, that is to say IFDMA with CRF>1.

A configuration of the uplink resources as shown in FIG. 10 is noted, in which a periodic TDMA structure with the period 4 is assumed. Resource blocks 1007, 1008 are accordingly respectively reserved for Type 2 RACH transport channels in the respective first two TTIs 1001, 1002. Furthermore, the resource blocks 1009, 1010, 1011 are respectively reserved for Type 1 RACH transport channels for every fourth TTI (for example TTI-4 1004).

According to an embodiment, it is assumed that the UE 718 is in the first RRC state LTE_Detached 901, and that it wishes to send a request to set up a mobile radio link to the mobile radio network.

For this purpose, the UE 718 reads the configuration of the three Type 1 RACH transport channels (the UE 718 may use only Type 1 RACH transport channels since it is in the first RRC state LTE_Detached 901), and this is signaled using the broadcast channel to all of the subscribers located in the mobile radio cell, with this being assumed to be as follows:

TTI=4
RACH/PRACH-1: CRF=1, frequency offset 1
RACH/PRACH-2: CRF=1, frequency offset 2
RACH/PRACH-3: CRF=1, frequency offset 3

The UE 718 randomly chooses the RACH/PRACH-2 channel (of Type 1) and sends the request at the next possible time to TTI-4 1004. In conjunction with this, the UE 718 automatically changes to the second RRC state LTE_Active 902.

According to another embodiment, it is assumed that the mobile radio network receives the call request and configures the joint E-USCH resources for the mobile radio link to be set up for the UE 718, that is to say the mobile radio network signals to the UE 718 the state change from the first RRC state LTE_Detached 901 to the second RRC state LTE_Active 902, and the configuration of the E-USCH resources (CRF=1, frequency offset X) by means of a joint downlink signaling channel. During the subsequent uplink transmission, the UE 718 transmits the E-USCH channel for transmission of signaling information and payload data in all TTIs and resource blocks which are allocated for the UE 718.

According to another embodiment of the invention, it is assumed that the UE 718 is in the second RRC state LTE_Active 902 and that the mobile radio network decides on the basis of decreasing UE activity to allocate the Type 2 RACH resources to the UE 718 for data transmission. The mobile radio network signals this reconfiguration with the new Type 2 RACH resources (CRF=1, frequency offset Y) to UE 718. After reception of the message, the UE 718 clears the E-USCH resources. When required, the UE 718 can subsequently use the allocated Type 2 RACH channel for transmission of signaling information and payload data in the frequency resources and TTIs which are reserved for Type 2 RACH transport channels, but in each case at most once per period.

In summary, in the case of an exemplary embodiment of the invention, two types of RACH transport channels are defined and used for the transmission of signaling information and user data at a medium or low data rate and with a relatively long transmission delay.

Either Type 1 or Type 2 RACH channels can be sent in one predetermined defined TTI, but not Type 1 and Type 2 RACH channels at the same time in the same TTI.

The network allocates the radio resources for E-USCH and RACH on the basis of a defined transmission period, that is to say the transmission scheme is repeated after a defined number of TTIs.

The invention claimed is:

1. A communication device, comprising:
   a data transmission control unit configured to control transmission of data onto a communication channel and provide at least two radio resource control communication link states of the radio resource control protocol layer,
   wherein, when the data transmission control unit is in a first radio resource control communication link state, the data transmission control unit allocates the data to a first common communication channel or to a second common communication channel,
   wherein the first common communication channel or the second common communication channel is selected based on the amount of data to be transmitted, and
   wherein, when the data transmission control unit is in a second radio resource control communication link state, the data transmission control unit allocates the data to be transmitted to a third common communication channel; and
   a transmission unit configured to transmit the data via the common communication channel to which the data to be transmitted is allocated,
   wherein the common communication channels are common mobile radio transport channels, the first common communication channel is an enhanced uplink shared channel, the second common communication channel is a first random access channel, and the third communication channel is a second random access channel.

2. A method for transmitting data from a first communication device to a second communication device, wherein the first communication device can assume at least two radio resource control communication link states of the radio resource control layer, comprising:
   transmitting the data by the first communication device when the first communication device is in the first radio resource control communication link state, via a first common communication channel or via a second common communication channel to the second communication device, wherein the first common communication channel or the second common communication channel is selected based on the amount of data to be transmitted; and
   transmitting, when the first communication device is in the second radio resource control communication link state, data via a third common communication channel to the second communication device, wherein the common communication channels are common mobile radio transport channels, the first common communication channel is an enhanced uplink shared channel, the second common communication channel is a first random access channel, and the third communication channel is a second random access channel.

3. The method as claimed in claim 2, wherein at least one of the first communication device and the second communication device is a mobile radio communication device.

4. The method as claimed in claim 2, wherein the first communication device is a communication terminal.

5. The method as claimed in claim 2, wherein the second communication device is a communication network device.

6. The method as claimed in claim 2, wherein the first communication device is a communication network device.

7. The method as claimed in claim 2, wherein the second communication device is a communication terminal.

8. The method as claimed in claim 2, wherein in the first communication link state, the first communication device has set up a signaling communication link and a data communication link to the second communication device.

9. The method as claimed in claim 2, wherein in the second communication link state, the first communication device has set up only a signaling communication link to the second communication device.

10. The method as claimed in claim 2, wherein at least one of different time periods and different frequency ranges is/are associated with the second common communication channel and with the third common communication channel.

11. The method as claimed in claim 2, further comprising:
mapping the data from the first common communication channel onto a first common physical communication channel; and
transmitting the data in the first common communication channel via the first common physical communication channel to the second communication device.

12. The method as claimed in claim 11, further comprising:
mapping the data from the first common communication channel onto a physical uplink shared channel; and
transmitting the data in the first common communication channel via the physical uplink shared channel to the second communication device.

13. The method as claimed in claim 2, further comprising:
mapping the data from the second common communication channel onto a second common physical communication channel; and
transmitting the data in the second common communication channel via the second common physical communication channel to the second communication device.

14. The method as claimed in claim 13, further comprising:
mapping the data from the second common communication channel onto a physical random access channel; and
transmitting the data from the second common communication channel via the physical random access channel to the second communication device.

15. The method as claimed in claim 13, further comprising:
mapping the data from the third common communication channel onto a third common physical communication channel; and
transmitting the data in the third common communication channel via the third common physical communication channel to the second communication device.

16. The method as claimed in claim 15, further comprising:
mapping the data from the third common communication channel onto a physical random access channel; and
transmitting the data in the third common communication channel via the physical random access channel to the second communication device.

* * * * *